United States Patent
Slik

(10) Patent No.: US 8,032,580 B2
(45) Date of Patent: *Oct. 4, 2011

(54) CONTENT DISTRIBUTION SYSTEM FOR GENERATING CONTENT STREAMS TO SUIT DIFFERENT USERS AND FACILITATING E-COMMERCE TRANSACTIONS USING BROADCAST CONTENT METADATA

(75) Inventor: David Slik, Brackendale (CA)

(73) Assignee: NetApp, Inc., Sunnyvale, CA (US)

( * ) Notice: Subject to any disclaimer, the term of this patent is extended or adjusted under 35 U.S.C. 154(b) by 1469 days.

This patent is subject to a terminal disclaimer.

(21) Appl. No.: 11/400,240

(22) Filed: Apr. 10, 2006

(65) Prior Publication Data

US 2006/0190358 A1    Aug. 24, 2006

Related U.S. Application Data

(63) Continuation of application No. 09/493,087, filed on Jan. 28, 2000, now Pat. No. 7,028,071.

(51) Int. Cl.
*G06F 15/173* (2006.01)
*G06F 15/16* (2006.01)
*H04N 7/10* (2006.01)

(52) U.S. Cl. ............... 709/201; 709/226; 725/34

(58) Field of Classification Search ............ 705/30
See application file for complete search history.

(56) References Cited

U.S. PATENT DOCUMENTS

| | | | |
|---|---|---|---|
| 4,089,059 A | 5/1978 | Miller et al. | 708/130 |
| 4,507,778 A * | 3/1985 | Tan | 370/443 |
| 4,510,600 A | 4/1985 | Tan | 370/458 |
| 5,155,591 A | 10/1992 | Wachob | 358/86 |
| 5,627,822 A | 5/1997 | Edmaier et al. | 370/218 |
| 5,652,615 A | 7/1997 | Bryant et al. | 348/9 |
| 5,652,749 A * | 7/1997 | Davenport et al. | 370/466 |
| 5,694,334 A * | 12/1997 | Donahue et al. | 709/247 |
| 5,706,507 A | 1/1998 | Schloss | 395/615 |
| 5,724,521 A | 3/1998 | Dedrick | 395/226 |
| 5,745,889 A | 4/1998 | Burrows | 707/2 |
| 5,754,854 A * | 5/1998 | Kanamori et al. | 718/104 |
| 5,774,170 A * | 6/1998 | Hite et al. | 725/34 |
| 5,774,664 A | 6/1998 | Hidary et al. | 395/200.48 |
| 5,793,980 A | 8/1998 | Glaser et al. | 395/200.61 |
| 5,802,278 A | 9/1998 | Isfeld et al. | 395/200.02 |
| 5,819,092 A | 10/1998 | Ferguson et al. | 395/701 |
| 5,841,775 A | 11/1998 | Huang | 370/422 |
| 5,848,396 A | 12/1998 | Gerace | 705/10 |

(Continued)

FOREIGN PATENT DOCUMENTS

EP        425421 A2 *   5/1991

(Continued)

*Primary Examiner* — Matthew S Gart
*Assistant Examiner* — Ashford Hayles
(74) *Attorney, Agent, or Firm* — Roylance, Abrams, Berdo & Goodman, LLP

(57) ABSTRACT

A content distribution system is provided to facilitate e-commerce transactions for products and services associated with distributed content. A content stream comprising content blocks, reference content blocks and floating reference content blocks uses metadata to identify products and services associated with content blocks. The metadata and floating reference content blocks are used to substitute dynamically selected content for content blocks based on profiles of user (s), the broadcast station, the advertisement spot defined in the stream and content available for substitution. A market server determines optimal matches to support content substitution, and performs brokerage and bidding functions among suppliers of products or services associated with content selected by users.

10 Claims, 5 Drawing Sheets

U.S. PATENT DOCUMENTS

| | | | |
|---|---|---|---|
| 5,855,008 A | 12/1998 | Goldhaber et al. | 705/14 |
| 5,862,325 A | 1/1999 | Reed et al. | 395/200.31 |
| 5,889,950 A | 3/1999 | Kuzma | 395/200.48 |
| 5,893,005 A | 4/1999 | Ogura | 399/11 |
| 5,900,905 A | 5/1999 | Shoff et al. | 348/12 |
| 5,905,865 A | 5/1999 | Palmer et al. | 395/200.47 |
| 5,912,696 A | 6/1999 | Buehl | 348/5.5 |
| 5,917,830 A * | 6/1999 | Chen et al. | 370/487 |
| 5,918,213 A | 6/1999 | Bernard et al. | 705/26 |
| 5,918,229 A * | 6/1999 | Davis et al. | 705/27.1 |
| 5,920,410 A | 7/1999 | Smith et al. | 359/119 |
| 5,920,700 A | 7/1999 | Gordon et al. | 395/200.56 |
| 5,931,901 A | 8/1999 | Wolfe et al. | 709/206 |
| 5,931,907 A | 8/1999 | Davies et al. | 709/218 |
| 5,937,392 A | 8/1999 | Alberts | 705/14 |
| 5,944,783 A | 8/1999 | Nieten | 709/202 |
| 5,963,915 A | 10/1999 | Kirsch | 705/26 |
| 5,973,685 A * | 10/1999 | Schaffa et al. | 715/722 |
| 5,978,567 A * | 11/1999 | Rebane et al. | 709/219 |
| 5,983,005 A | 11/1999 | Monteiro et al. | 395/200.61 |
| 5,991,801 A * | 11/1999 | Rebec et al. | 725/116 |
| 5,999,908 A | 12/1999 | Abelow | 705/1 |
| 6,006,197 A | 12/1999 | d'Eon et al. | 705/10 |
| 6,009,410 A | 12/1999 | LeMole et al. | 705/14 |
| 6,029,195 A | 2/2000 | Herz | 725/116 |
| 6,119,163 A * | 9/2000 | Monteiro et al. | 709/227 |
| 6,169,542 B1 * | 1/2001 | Hooks et al. | 715/719 |
| 6,338,044 B1 * | 1/2002 | Cook et al. | 705/14.54 |
| 6,357,042 B2 * | 3/2002 | Srinivasan et al. | 725/32 |
| 6,505,169 B1 * | 1/2003 | Bhagavath et al. | 705/14.66 |
| 6,833,865 B1 * | 12/2004 | Fuller et al. | 348/231.2 |
| 6,850,258 B2 | 2/2005 | Saitoh et al. | 715/830 |
| 6,973,258 B1 * | 12/2005 | Yoo et al. | 386/330 |
| 7,079,176 B1 * | 7/2006 | Freeman et al. | 348/207.1 |
| 7,120,871 B1 * | 10/2006 | Harrington | 715/205 |
| 7,243,139 B2 * | 7/2007 | Ullman et al. | 709/219 |
| 7,448,063 B2 * | 11/2008 | Freeman et al. | 725/136 |
| 2001/0013123 A1 | 8/2001 | Freeman et al. | 725/34 |
| 2003/0088872 A1 | 5/2003 | Maissel et al. | 725/46 |
| 2004/0030759 A1 | 2/2004 | Hidary et al. | 709/218 |
| 2005/0033760 A1 * | 2/2005 | Fuller et al. | 707/100 |

FOREIGN PATENT DOCUMENTS

GB 2336079 6/1999

* cited by examiner

CONTENT DISTRIBUTION SYSTEM FOR GENERATING CONTENT STREAMS TO SUIT DIFFERENT USERS AND FACILITATING E-COMMERCE TRANSACTIONS USING BROADCAST CONTENT METADATA

CROSS-REFERENCE TO RELATED APPLICATION

This application is a continuation of a U.S. Patent Application of David B. Slik, entitled "Content Distribution System For Generating Content Streams To Suit Different Users And Facilitating E-Commerce Transactions Using Broadcast Content Metadata", Ser. No. 09/493,087, filed Jan. 28, 2000 now U.S. Pat. No. 7,028,071, the entire content of which is incorporated herein by reference.

FIELD OF THE INVENTION

The invention relates to a system for transmitting streams of content comprising metadata to facilitate e-commerce transactions for products or services associated with the content, substitution of dynamically selected content into a content stream, generation of data relating to which content is being used by what users.

BACKGROUND OF THE INVENTION

The Internet and the World Wide Web (WWW) have met an increasing demand for multimedia content and e-commerce transaction services. Consumers are becoming more reliant on the Internet and the WWW to obtain information on products and services and to order and pay for them. Using web browsers to locate such information, however, is often deferred until after a consumer makes an initial decision to locate and order a product or service on-line. For example, a consumer may be listening to a broadcast song and decide to purchase a compact disc or concert tickets by the artist of the song. On-line shopping for these items typically occurs at a later time when the consumer has an opportunity to use a personal computer with on-line access and the time to search for the item via a web browser.

A need exists for a system which provides information to a consumer for products and services related to distributed or broadcast content and facilitates e-commerce transactions to order products or services associated with content as it is being received. A need also exists for a user device with which to receive the content and information indicating products or services relating to the received content, as well as to request and place orders for these items.

A need also exists for personalization of content delivery to reduce the need for consumers to browse on-line for content, and products and services that are of interest to them. In addition, a need exists to provide different entities responsible for making content and related products and services available to consumers with greater incentive to do so. These entities can include, for example, content providers, broadcast stations that employ programming to provide streams of content, and broadband providers providing the network or other transmission path for the content.

SUMMARY OF THE INVENTION

The above-described disadvantages are overcome and a number of advantages are realized with the system of the present invention in which content is formatted into a stream of content for transmission to users. The content is formatted in content blocks that have metadata associated therewith. Content can be audio programs, audio/video programs, text, financial data and graphics, among other types of content. Metadata is preferably information that is associated with an entity (e.g., a user device, a broadcast station, and a content provider), a content block in the stream of content, or a transaction to select, order and purchase content, a product or a service. Metadata can be transmitted in-band (e.g., embedded in a content block) or out-of-band (i.e., transmitted via a path or channel other than the content path).

In accordance with another aspect of the present invention, a user device is configured to receive a stream of content and to provide a user interface. The metadata can be used to provide an indication via the user interface of the types of products and services that are available and which relate to the content currently being received via the user device.

In accordance with yet another aspect of the present invention, a user device can be connected to a distribution router from which to locate and access content made available by a number of content providers.

In accordance with still yet another aspect of the present invention, metadata can point to a content block or to a reference content block in the stream of content. The reference content block comprises other metadata. The distribution router is programmable to allow metadata in a content block or in a reference content block to be overridden by the metadata that points to it.

In accordance with another aspect of the present invention, a market server is provided that is connected to suppliers of products or services that are related to content in a stream of content or suppliers of advertisements for products or services. The market server maintains profiles of the users, the broadcast station of the stream of content, and empty floating reference content blocks provided in the stream of content for fulfillment with dynamically selected content. The content or advertisement can be personalized in the stream transmitted to a particular user.

In accordance with another aspect of the present invention, log entries are generated to identify which users are requesting what content blocks, among other information.

BRIEF DESCRIPTION OF THE DRAWINGS

The various aspects, advantages and novel features of the present invention will be more readily comprehended from the following detailed description when read in conjunction with the appended drawings, in which.

Throughout the drawing figures, like reference numerals will be understood to refer to like parts and components.

DETAILED DESCRIPTION OF THE PREFERRED EMBODIMENTS

Figure 1:
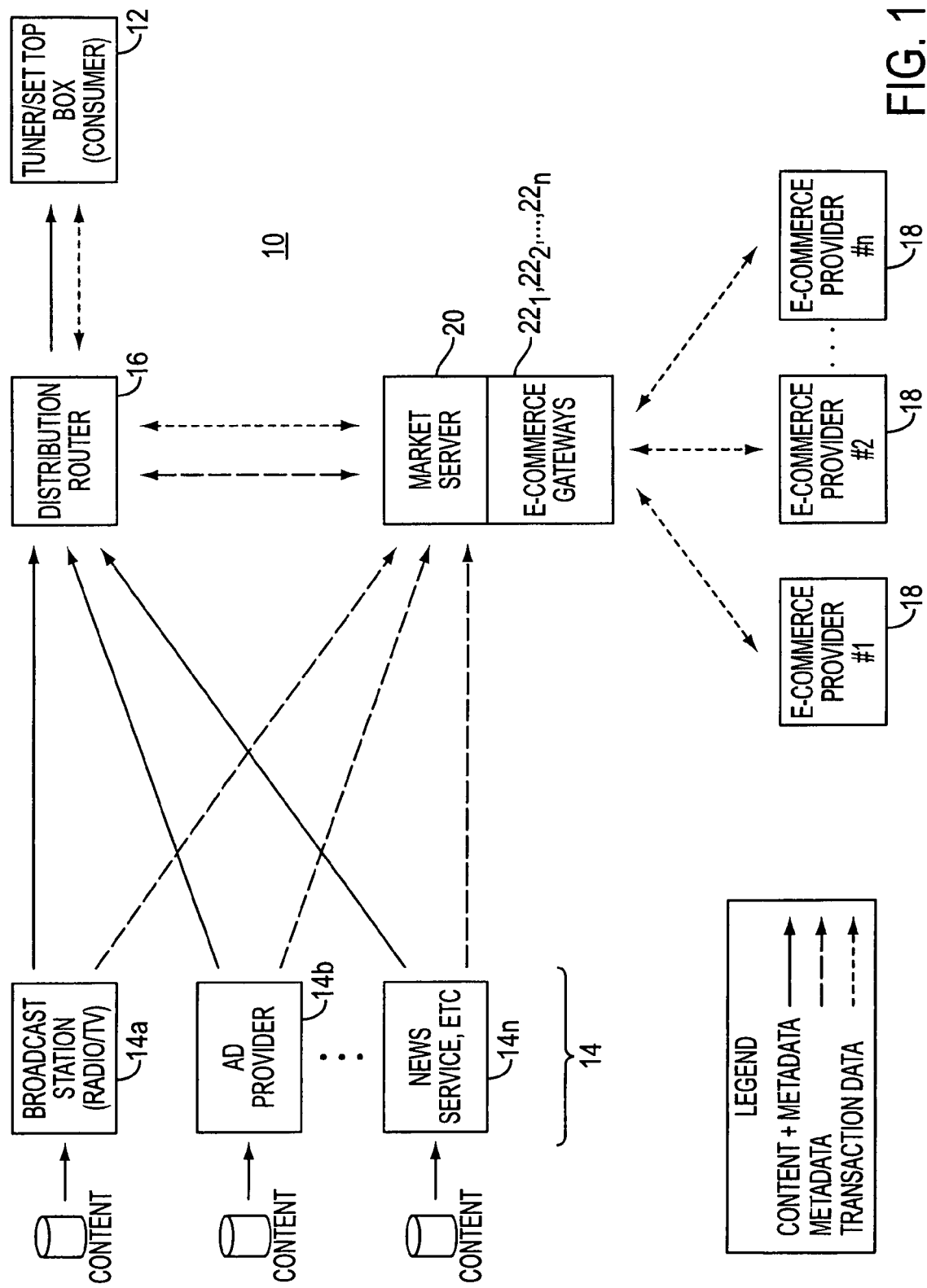
FIG. 1 has a block diagram of a content distribution system constructed in accordance with an embodiment of the present invention.

A content distribution system (CDS) 10 constructed in accordance with the present invention is depicted in FIG. 1.

The CDS 10 associates products and services with broadcast content to allow users to conduct e-commerce transactions when they are most likely to purchase. The resulting, increased revenue stream provided by the CDS 10 can then be shared by content providers, broadcast providers, broadband providers and e-commerce providers, as described below.

Content can be, but is not limited to, audio, video, data, graphics, text and multimedia information. The content is preferably transmitted via a distribution system which can be a communications network including, but not limited to, direct network connections, server-based environments, telephone networks, the Internet, intranets, local area networks (LAN), wide area networks (WAN), the WWW or other webs, transfers of content via storage devices, coaxial cable, power distribution lines (e.g., either residential or commercial power lines), fiber optics, among other paths (e.g., physical paths and wireless paths). For example, content can be sent via satellite or other wireless path, as well as wireline communications networks, or on the same path as a unit of power provided by a utility company.

With continued reference to FIG. 1, the CDS 10 comprises a plurality of user devices 12. The user devices preferably locate, request and obtain content from a plurality of content providers referred to generally as 14 (e.g., a broadcast station 14a) via a distribution router 16. A content provider 14 can be an entity that places content and metadata associated therewith onto a distribution network (e.g., via radio or television stations or a cable television headend). A content distributor such as a broadband provider or cable company can then transmit the content on the distribution network The distribution router 16 preferably resides in the headend of a broadband provider. The distribution router 16 allows different streams of content to be looked up and requested by users, and converts unicast streams to multicast streams to reduce network traffic. The distribution router 16 can also store directories of locally-connected user devices 12. A plurality of distribution routers 16 can be employed to manage larger numbers of users.

Broadcast stations 14a assemble content into station programming and encode audio and/or video content for transmission (e.g., via the Internet). In addition to content, metadata is provided with the transmitted content (e.g., embedded therein) which describes the content and how it can be used. Content providers 14 can also be advertisement providers 14b, new services 14n, pay content services, and so on, which provide their specific streams of content upon demand. As with broadcast stations, these types of content providers 14 also provide associated metadata with the content. By way of an example, the broadcast station system can comprise a broadcast server with which to convert a broadcast program signal into a format suitable for transmission over the Internet. Accordingly, the broadcast server provides a continuous stream of content and metadata onto a network.

In the illustrated example, a user device 12 is provided with a tuner or other receiver device to receive content from the transmission path, to playback the streamed content for the user, as well as to interact with the content (e.g., allow the selection and purchase a product or service associated with the content from one of a number of e-commerce providers 18). The user device 12 is configured to primarily change received streams based on incoming metadata. The user device 12 uses the metadata provided with the content to switch between content streams and to enable initiation of transactions related to the content through the distribution router 16. As stated previously, a distribution router 16 preferably resides in a broadband provider's network and provides content stream delivery services and multicast services to user devices 12 that are preferably locally connected.

User devices can be employed in a user's residence or office, for example, or implemented as a mobile unit. The user device 12 comprises hardware and software devices to allow a user to connect to streams made available by the distribution router 16. The user device can be implemented, for example, as a stereo equipment component having an output port to provide an audio output to a stereo receiver. The user device 12 can also be provided with loudspeakers and a display device for playback of the received content stream.

Figure 2:
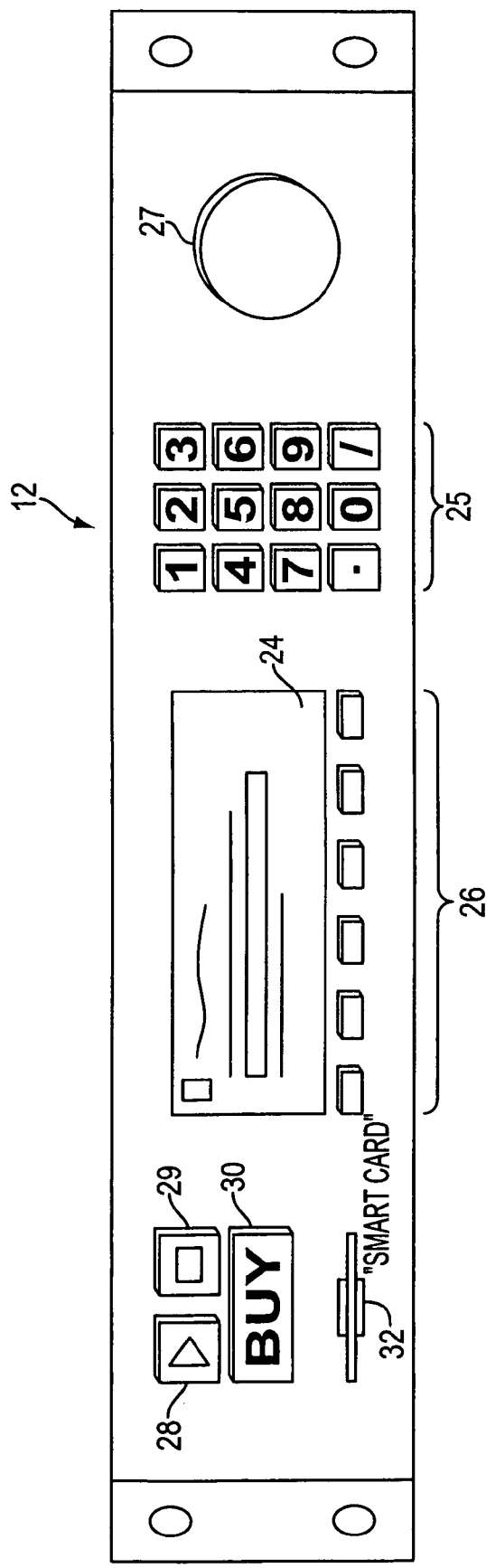
FIG. 2 is a user device interface for locating and requesting content in accordance with an embodiment of the present invention.

User devices 12 are provided with a user interface to facilitate content interaction (e.g., e-commerce transactions). An exemplary user interface is provided in FIG. 2. The user device 12 preferably comprises a display device 24 and one or more user input devices such as a key pad 25, programmable buttons 26 and a dial 27 with which to select channels from a stream of content, control output volume, among other functions. The user device 12 can be programmed to provide a user with one or more options for products or services associated with content being received, and to support e-commerce transactions to order and purchase selected ones of the associated products and services. For example, a button 28 is programmable to initiate a request from the user device 12 to the distribution router 16 to commence a bidding process for goods and/or services associated with content that is being played back. A button 29 can be depressed to interrupt the bidding process. The results of the bidding process (i.e., a list of suppliers and their respective quotes) is preferably displayed on the display device 24. The programmable buttons 26, for example, can be programmed to allow a user to select a supplier from the list. The user can then depress a BUY button 30 to complete the e-commerce transaction and purchase the good or service from the selected supplier. A smart card reader 32 can be provided in the user device 12 to permit use of a debit or credit card when purchasing the selected good or service.

Figure 3A:
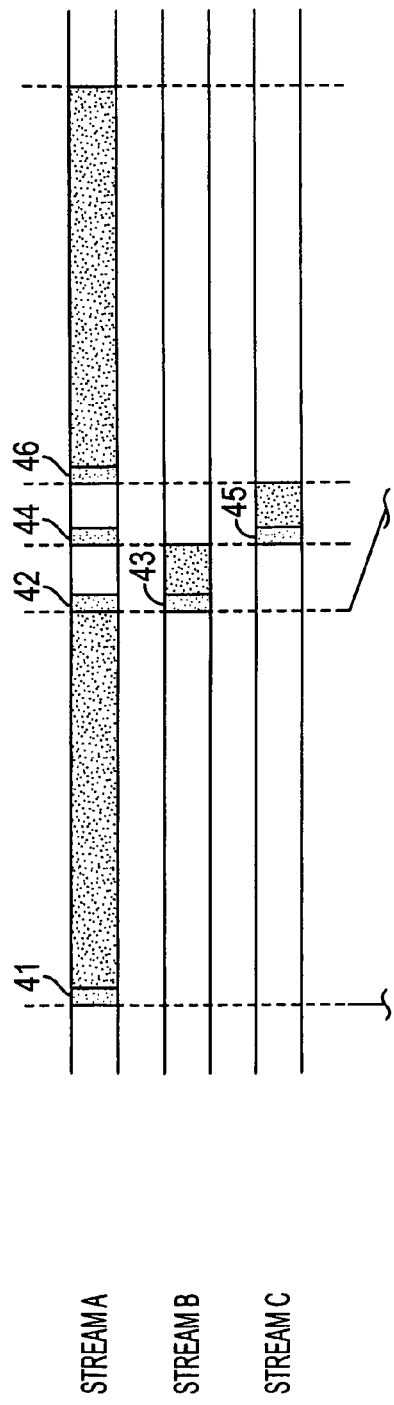
FIG. 3 illustrates an exemplary stream of content configured in accordance with an embodiment of the present invention.
Figure 3B:
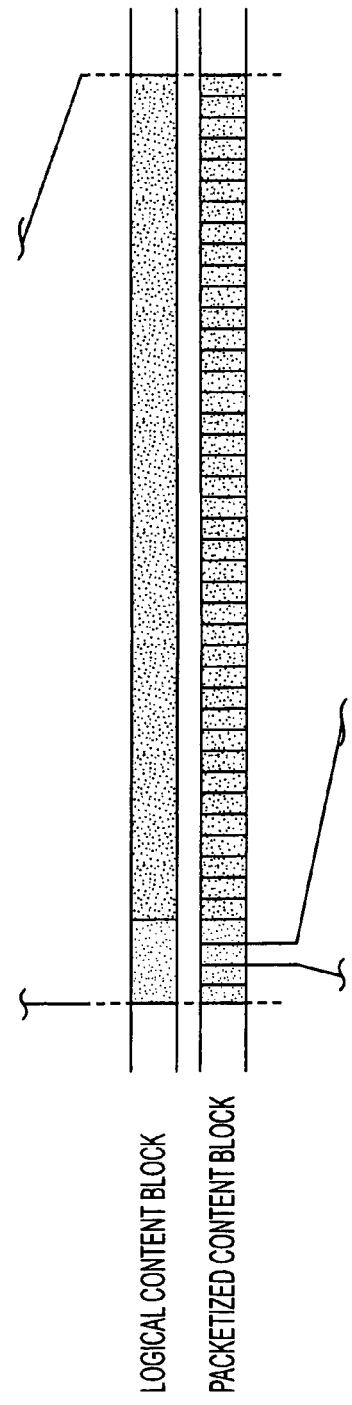
Figure 3C:
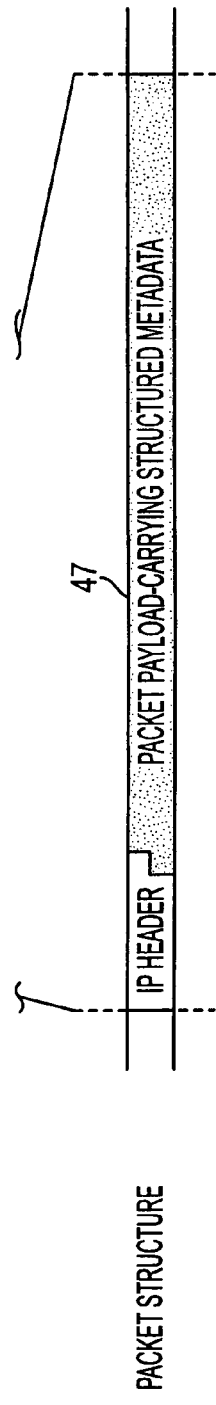

FIG. 3 depicts an exemplary stream of content which comprises blocks of content in accordance with an aspect of the present invention. A stream is preferably a continuous series of content blocks 41 and reference content blocks 42 that are associated with a content provider 14 such as a radio station. In accordance with another aspect of the present invention, metadata 47 is provided with the stream of content. The metadata can be transmitted in-band or out-of-band with respect to the content. Varying amounts of metadata 47 are associated with each entity (e.g., content owner, content provider, content distributor and user), content block and transaction. A content block can have content block permissions associated therewith, that is, metadata which defines what can be done with a content block. For example, a content block can comprise a "copy restriction" flag indicating that the content cannot be recorded or retained by the user device 12. The flag can also indicate that a content block is to be used in place of another content block. Some exemplary metadata types include, but are not limited to, the duration of the content block, its title, type of block, security options, a description of the content, a description of associated products, a description of the content owner, a description of user rights, and so on. A specialized metadata is associated with specific business processes to enable bidding among different e-commerce providers to supply the associated products and services, content substitution based on user or user groups, e-commerce and other processes.

With continued reference to FIG. 3, a stream of content can comprise reference content blocks (e.g., block 42 having a fixed reference to block 43) and floating reference content blocks (e.g., block 44 which is resolved to a block 45 using a process described in connection with FIG. 5), in addition to the blocks of content 41 and 46 with which metadata 47 is associated to define duration, costs and other information. A reference content block (e.g., block 42) is an empty content block preferably having only metadata that refers to a second, different content block or reference content block (e.g., block 43). The metadata in a reference content block can override some of the metadata in a content block that is pointed to and is resolved by the distribution router 16. A floating reference content block (e.g., block 44) is a reference content block that does not yet point to a content block or reference content block. The metadata in a floating reference content block is preferably resolved by a market server 20, as indicated in FIG. 1. The use of floating reference content blocks is described in more detail below in connection with FIG. 5 relating to content substitution based on user(s) preferences or profile(s).

With further reference to FIG. 1, the CDS 10 comprises a market server 20 which preferably resides in backbone hubs located near large population centers. An e-commerce gateway 22 connects the e-commerce providers 18 to the market server 20 to allow e-commerce interaction including query and purchase transaction operations. The e-commerce providers are forwarded transactions and queries about products and services from the users via their interaction with the market server 20 and the e-commerce gateway 22. Financial transactions in the CDS 10 preferably occur on the market server 20 or on the e-commerce provider systems. The market server 20 collects system information and maintains information about active streams. A number of market servers can be employed to manage larger sizes of CDS systems 10.

The market server 20 is configured to provide content and transaction brokerage functions, as well as to perform content and consumer matching functions. The transaction dispatching, profile matching, and brokerage and bidding functions performed by the market server 20 enable different business models including e-commerce and content (e.g., advertisement) substitution, as well as facilitates data collection.

As will be described in more detail below, a number of aspects of the CDS 10 improve e-commerce capabilities of a content distribution system. The metadata architecture associated with content blocks and reference content blocks permits blocks of content to refer to different blocks with content depending on which user is requesting the content. The CDS 10 provides seamless playback transition between different blocks of content at respective user devices 12. The CDS system 10 provides communication between the user devices 12 and the market server 20 to allow for information about consumer behavior to be collected, aggregated, stored and analyzed by the market server 20. Such information allows the market server 20 to perform real-time spot market functions whereby floating reference content blocks in streams provided by a content provider 14 to users can be substituted with different content (e.g., advertisements), depending on the user. The market server 20 can also perform brokerage and dispatching functions whereby several e-commerce providers are located in response to a user request for products and/or services associated with received content. The CDS 10 provides an e-commerce exchange interface that allows back end systems of multiple e-commerce providers to be interfaced. This is accomplished by using an intermediate data representation format (e.g., XML) to provide a mechanism by which the queries and results from an e-commerce provider can be easily exchanged. Each e-commerce gateway 22 interfaces with a different e-commerce provider, allowing the market server 20 to communicate with multiple e-commerce providers to facilitate brokerage and dispatching functions.

An exemplary e-commerce transaction will now be described with reference to FIG. 4. A broadcast station provides information about the content it will be transmitting and/or product identifiers into metadata associated with each content block (block 50). A user device 12 receives a broadcast stream from the broadcast station 14 which has associated in-band or out-of-band metadata. The presence of the metadata results in different interface elements in the user device 12 being activated. For example, the user device 12 can be programmed to provide the user with a "buy" button or activate a smartcard reader (block 52). The user can therefore activate the "buy" button to indicate an interest in the products and/or services associated with the received content (block 54). In response to the user input device, the user device 12 initiates a transaction through the distribution router 16 to the market server 20, sending the metadata from the content block or reference content block being received when the "buy" button was depressed.

Figure 4:
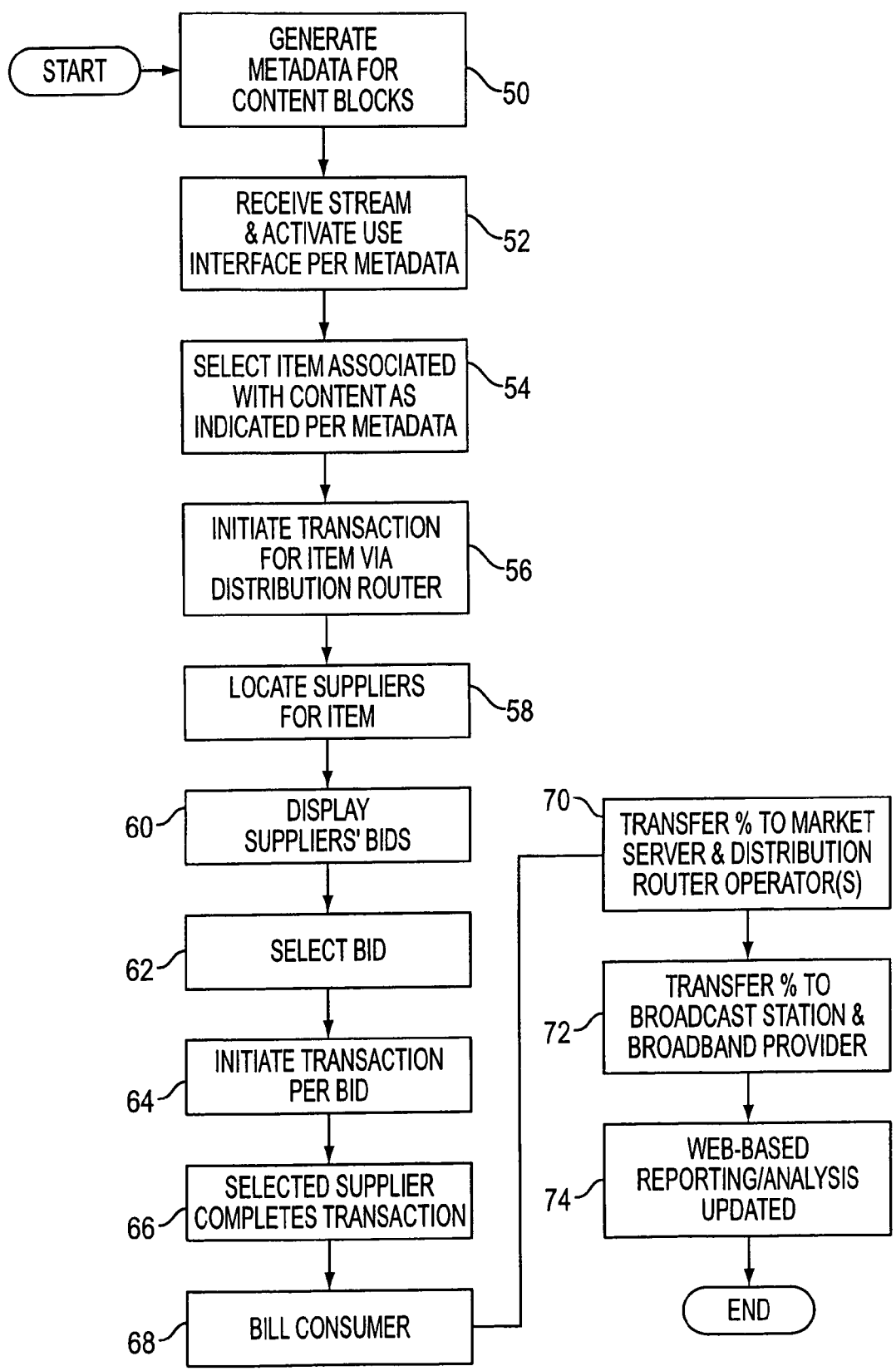
FIG. 4 is a flowchart depicting a sequence of operations for completing an e-commerce transaction in accordance with an embodiment of the present invention.

With continued reference to FIG. 4, the market server 20 initiates a number of transactions with one or more e-commerce suppliers based on the metadata related to the user device 12, broadcast station 14a and content block to obtain quotes for products and/or services associated with the content or product identifiers. Queries generated by the market server 20 are preferably highly focused based on the available metadata to insure that returned results are accurately targeted to the metadata initiating the transaction. The market server 20 aggregates responses from the e-commerce providers that have or can obtain the associated products and/or services, and then can package, format and sort quotes to be sent to the user device 12 via the distribution router 16 (block 58). The user device 12 responds by displaying a list of products and/or services and information about each item. Thus, the user is permitted to make a purchasing decision based on price, delivery, brand name, trust or other factors displayed by the user device (block 60). The CDS 10 is advantageous because a user can inquire about products and/or services relating to content as it is being received with minimal effort because of the convenience of the user device interface and the operations of the distribution router 16 and market server 20.

After a user selects a product and/or server and supplier therefore, the user device generates an interface to prompt the user for authorization to conduct a transaction on behalf of the user and to obtain any information required to complete the transaction to purchase the selected product from the selected supplier (block 62). For example, the user can consent by entering a personal identification number on the keypad of the user device 12, inserting a smartcard, or pressing a button, among other methods. As indicated in block 64, a transaction is sent to the market server 20 via the distribution router 16. The market server 20 passes the required information to conduct the transaction to the e-commerce provider selected as the supplier (block 64). E-commerce provider 18 processes the transaction and returns a result that is sent to the user device 12 via the market server 20 and the distribution router 16 (block 66). The user is then billed for the purchased products and/or services (block 68).

With continued reference to FIG. 4, the CDS 10 allows an entity that bills a user to transfer a percentage of the transaction to a second entity which operates the distribution router 16 and/or the market server 20 (block 70). The second entity can, in turn, transfer a percentage of the amount received to the station 14 and/or the broadband provider (block 72). Web-based reporting and analysis for the broadcast station 14 and the broadband provider is subsequently updated (block 74).

The distribution router 16 collects information about users' activities, which is generally limited to information that is needed to service the users' requests such as the information indicated in the following table:

TABLE

EXAMPLE LOG SEGMENT

| # | Action (Inferred) | IP Address (Inferred) | Request (Specified) | Content Block (Specified) | Date (Inferred) | Time (Inferred) | Type (Inferred) |
|---|---|---|---|---|---|---|---|
| 1 | Startup | 193.21.56.29 | ID>URL | 198763544 | 991101 | 12:42:05 UT | 1 |
| 2 | Request | 193.21.56.29 | ID>URL | 129865124 | 991101 | 12:42:21 UT | 1 |
| 3 | Connect | 193.21.56.29 | | 129865124 | 991101 | 12:42:23 UT | 1 |
| 4 | Request | 193.21.56.29 | ID>URL | 424918647 | 991101 | 12:42:26 UT | 1 |
| 5 | Connect | 193.21.56.29 | | 424918647 | 991101 | 12:42:27 UT | 1 |
| 6 | Close | 193.21.56.29 | | 424918647 | 991101 | 12:55:48 UT | 1 |
| 7 | Close | 193.21.56.29 | | 129865124 | 991101 | 12:55:48 UT | 1 |

The information in the table is similar to information collected by a server when a user visits a web page. For example, when a user powers on a user device 12, the user device searches and finds a local distribution router 16. If the user has a customized directory for example, the user device 12 contacts the local distribution router 16 and synchronizes a channel database. A start-up entry is generated, as indicated by line 1 in the table. The user can then select a channel to indicate that the channel should be enabled to the distribution router 16.

A user device 12 sends a request to the distribution router 16 for a content block associated with the channel, thereby generating another log entry as indicated by line 2 of the table. The distribution router 16 replies with a unicast stream address corresponding to the requested content block. The user device 12 then opens a stream using the indicated address for the content block on the distribution router 16, causing generation of a third log entry as indicated in line 3 of the table. The user device 12 receives a reference content block over the unicast stream corresponding to the channel. The user device 12 sends a request to the distribution router 16 asking for the content block associated with the reference content block. A fourth log entry is generated, as indicated by line 4 of the table. The distribution router 16 sends a reply with a unicast or multicast group corresponding to the requested content block. The user device opens a unicast stream to the content block to the distribution router, and a fifth log entry is generated as indicated by line 5 in the table. The tuner receives a content block over a unicast or multicast stream corresponding to the content block pointed to by the reference content block. When the user powers down the user device 12, the user device drops all open streams, causing generation of the log entries indicated on lines 6 and 7 of the table.

The CDS 10 provides a number of advantages to broadcast stations and other content providers 14 by providing additional revenue streams from goods and services sold as a byproduct of content and programming. In addition, a broadcast station can expand into a product sales business by enabling content and programming to be repackaged into saleable goods such as transcripts, recordings, and the like. The user device interface, distribution router 16, and market server allow real-time information collection and feedback such as voting and requests, as well as fee-based content services such as audio/video jukebox services, or pay radio or pay television. Real-time data collection is provided based on user behaviors. The effectiveness of advertising and promotions is increased by allowing request-based distribution of products such as literature and promotional packages.

The CDS 10 is also advantageous to e-commerce providers 18 by providing additional customers and purchasing volume. The effectiveness of advertising and promotions is increased by enabling instant fulfillment. In accordance with one embodiment of the present invention, an e-commerce provider builds a direct relationship with the user and provides a share of their revenue stream therefrom to the entity operating the distribution router 16 and the market server 20. Alternatively, a broadband provider having a direct relationship with the user can handle the e-commerce billing and channel portions of the revenue stream therefrom to the e-commerce providers and entity operating the distribution router and market server. In either embodiment, the broadband provider is provided with an additional source of revenue resulting from a percentage of financial transactions conducted over the network. In addition, the broadband provider can provide users with an additional source of high quality reliable streamed media and pay content services.

In accordance with an aspect of the present invention, broadcast stations in the CDS 10 can place blocks of content into a transmitted stream which can be dynamically replaced by other blocks of content. The market server 20 is configured to employ a matching algorithm to allow advertisers to bid on spots in the stream in real-time on a group or user-by-user basis. When the spots or replaceable content blocks, hereinafter referred to as floating reference content blocks, are included in the stream, a real-time spot market is made available among advertisers using metadata provided about a particular user device 12, an advertisement or other substitute content, an advertiser or other content provider, and the broadcast station. As stated previously, the market server 20 collects and analyzes profiles of user or consumer behavior to facilitate the selection and substitution of content for another block of content or spot in the transmitted stream with other content selected based on one or more users.

Figure 5:
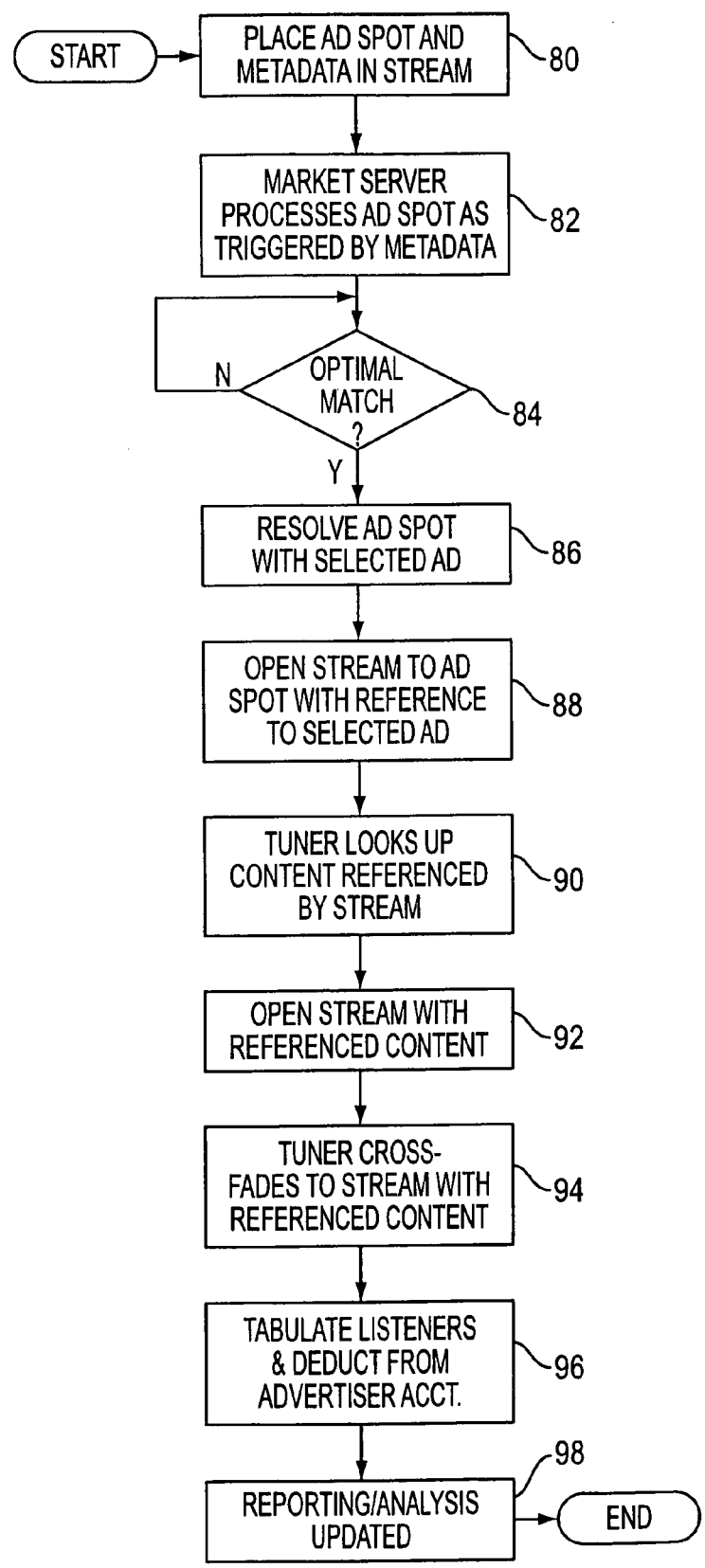
FIG. 5 is a flowchart depicting a sequence of operations for substituting content into a stream of content in accordance with an embodiment of the present invention.

With reference to FIG. 5, a flowchart is provided to illustrate processes involved in content substitution in accordance with the present invention. Each block is provided with a time indication wherein T corresponds to reception of a particular content block at a user device 12. The time period before the time T is indicated by the subtraction of a number of seconds. Correspondingly, the time period after which a content block is received at a user device as indicated as T plus a number of seconds. It is to be understood that the seconds added or subtracted from the time T are for illustrated purposes only, and that the actual processes involved in the content substitution can take more or less time than indicated in FIG. 5.

With reference to block 80 in FIG. 5, a broadcast station 18 places a floating reference content block into a broadcast stream. Metadata embedded in the stream or sent out-of-band specifies the duration and other information defining how the spot in the stream will be placed within the market. When the metadata is received by the market server 20, the market server 20 commences processing of the spot (block 82). The spot is hereinafter referred to as an advertisement spot for illustrative purposes. The market server 20 commences a bidding process to locate an optimal match between the profile of the broadcast station 14, the advertisement spots, the user(s) and available substitute content (advertisement) (block 84). To perform the content substitution process, the marker server 20 compares the metadata information contained in the floating reference content block, metadata about the broadcast station, metadata about the user, and the stored metadata associated with each possible content block (e.g., advertisement) that can be substituted. The metatdata about each possible content block is provided to the market server 20 when the content blocks are registered as on-demand content blocks. Using this metadata, a matching process can be executed that compares the different parts of the metadata to determine an optimal match from which the content block to be substituted is determined. The search for an optimal match is completed for each user, groups of users or for the entire stream, depending on guidelines specified in the metadata. When an optimal match or matches are found, the floating reference content blocks are resolved into blocks which are no longer floating and which contain references to the content blocks of the selected substitute content (e.g., advertisement) (block 86).

With continued reference to FIG. 5, when metadata in the selected advertisement or substitute content reaches the distribution router 16, the distribution router 16 looks up the reference content block indicated therein and opens up the corresponding stream(s) associated with the selected advertisement(s) (block 88). When the metadata associated with the selected advertisement teaches the user device 12, the user device looks up the floating reference content block that resolves to the second reference content block. When the user device looks up the second reference device content block, a content block is received with the advertisement specifically targeted at the user device (block 90). The stream to the selected advertisement is then opened by the user device (block 92). The user device then switches over to or cross-fades over to the advertisement stream and commences playing back the ad (block 94).

The number of users of each advertisement stream is tabulated, and the accounts of the corresponding substitute content or advertising companies can be automatically deducted and transferred to the account of the broadcast station, less an optional percentage retained by the operator of the market server and/or distribution router (block 96). Web-based reporting and analysis for the broadcast station 14 and the substitution content providers (e.g., advertising companies) is updated (block 98).

The ability of the CDS 10 to perform content substitution is advantageous to broadcast stations since returns on advertisement spots in the streams are optimized by allowing each individual spot to be sold to the highest and/or most suitable bidder. The broadcast station has detailed control over the types of advertisements associated with their broadcast streams. The advertiser or advertising companies also realize a number of advantages. The advertising companies are able to purchase those spots that are the most valuable to them. Further, advertisements can be targeted towards specific users. The advertising or substitute content provider preferably only pays for the number of users that actually played back the substitute content (e.g., advertisement). Thus, advertising companies can create individual advertising strategies for each potential user.

Although the present invention has been described with reference to a preferred embodiment thereof, it will be understood that the invention is not limited to the details thereof. Various modifications and substitutions have been suggested in the foregoing description, and others will occur to those of ordinary skill in the art. All such substitutions are intended to be embraced within the scope of the invention as defined in the appended claims.

What is claimed is:

1. A method of generating data streams with dynamically selected content comprising:
generating a data stream comprising content and metadata describing the content and how the content can be used and storing the data stream in a storage device for substitution;
transferring the data stream comprising the content and the metadata to another storage device that was selected depending on the metadata;
opening, at a router connected to at least one of the storage devices or other routers, a first user stream for transmission via a network to a user that is packetized into logical content blocks of different types comprising content blocks and at least one floating reference content block, and said floating reference content block being initially empty and later resolved to a content block; and
via the router, at least part of the data stream for said floating reference substituting, content block in said first user stream by looking up a reference in said floating reference content block to content selected for the user based on its metadata, the reference corresponding to the data stream, and opening the data stream from whichever one of said storage device and said another storage device is local to the user.

2. A method as claimed in claim 1, wherein at least one of said storage device and said another storage device is a distribution router that is locally-connected to the user.

3. A method as claimed in claim 1, wherein transferring comprises transferring the data stream comprising the content and the metadata to different storage locations depending on the metadata.

4. A method as claimed in claim 1, wherein said first user stream is packetized into logical content blocks of said different types comprising said content blocks, reference content blocks and said floating reference content blocks, said content blocks comprising at least one of metadata and data, said reference content blocks comprising a reference to another content block, and said floating reference content block being initially empty and later resolved to a content block or reference content block, and substituting further comprises:
resolving said floating reference block into at least one of a content block comprising the selected content and a reference content block comprising a reference to at least one content block comprising the selected content.

5. A method as claimed in claim 1, wherein the metadata comprises data specifying at least one of duration of a content block, number of bytes in a content block, title of content, type of block, security options, security options relating to at least one of encryption, decryption and integrity of the content, a description of the content, format of the at least one of content in a content block selected from the group consisting of audio, video, text, graphics, multimedia information, and data, a description of associated products, a description of the content owner, a description of user rights, unique block identifiers, and a description of how content can be used.

6. A method as claimed in claim 1, wherein the metadata is transferred via at least one of in-band transmission by embedding in said first content stream and out-of-band transmission.

7. A method as claimed in claim 1, wherein the data stream is used to generate different content streams having different content selected for different users and specified via reference content blocks resolved from said floating reference content blocks in said data stream, and said user devices are operable to switch between said different content streams using the metadata.

8. A method as claimed in claim 1, wherein said content blocks are selected from the group consisting of text, graphics, and multimedia information.

9. A method as claimed in claim 1, wherein substituting further comprises:

selecting a first content block from among a plurality of content blocks comprising unique identifiers in said first user stream;

receiving a first stream address corresponding to the first requested content block;

opening a first stream using the first stream address;

receiving a reference content block in said first stream, said reference content block comprising a reference to another one of said plurality of content blocks;

requesting a second content block associated with said another one of said plurality of content blocks;

receiving a second stream address corresponding to said second requested content block; and opening a second stream using said second stream address.

10. A method as claimed in claim 9, further comprising the steps of:

selecting a floating reference content block in said first user stream that comprises no content;

resolving said floating reference content block into at least one of a selected content block and a reference content block that refers to another selected content block based on said user; and substituting at least one of said selected content block and said reference content block for said floating reference content block in said first user stream.

* * * * *